(12) United States Patent
Farrah

(10) Patent No.: US 11,446,923 B2
(45) Date of Patent: Sep. 20, 2022

(54) SYSTEMS AND METHODS FOR IMPROVED FLEXOGRAPHIC PRINTING WITH REDUCED MOTTLING AND INCREASED HIGHLIGHT STABILITY

(71) Applicant: Xitron LLC, Ann Arbor, MI (US)

(72) Inventor: Bret Anthony Farrah, Tecumesh, MI (US)

(73) Assignee: XITRON LLC, Ann Arbor, MI (US)

( * ) Notice: Subject to any disclaimer, the term of this patent is extended or adjusted under 35 U.S.C. 154(b) by 0 days.

(21) Appl. No.: 16/795,326

(22) Filed: Feb. 19, 2020

(65) Prior Publication Data

US 2020/0262197 A1 Aug. 20, 2020

Related U.S. Application Data

(60) Provisional application No. 62/807,424, filed on Feb. 19, 2019.

(51) Int. Cl.
*B41F 33/16* (2006.01)
*B41F 5/24* (2006.01)
*H04N 1/405* (2006.01)
*B41C 1/05* (2006.01)

(52) U.S. Cl.
CPC .............. *B41F 33/16* (2013.01); *B41F 5/24* (2013.01); *H04N 1/405* (2013.01); *B41C 1/05* (2013.01)

(58) Field of Classification Search
CPC .. B41F 33/16; B41F 5/24; B41M 1/04; B41C 1/05
See application file for complete search history.

(56) References Cited

U.S. PATENT DOCUMENTS

| 7,126,724 | B2 * | 10/2006 | McCrea .................. B41C 1/00 |
| | | | 358/3.3 |
| 2003/0107768 | A1 | 6/2003 | Crounse |
| 2007/0002384 | A1 | 1/2007 | Samworth et al. |
| 2009/0013886 | A1 | 1/2009 | Caliari |
| 2009/0252937 | A1 | 10/2009 | Zeik et al. |
| 2021/0138814 | A1 * | 5/2021 | Morisse .................. B41N 1/12 |

\* cited by examiner

*Primary Examiner* — Leslie J Evanisko
*Assistant Examiner* — Leo T Hinze
(74) *Attorney, Agent, or Firm* — Stinson LLP

(57) ABSTRACT

A method of improved screening to increase stability in flexographic printing is provided. The method is performed by a flexographic printing system. The flexographic printing system includes a computer system and a flexographic printing device. The method includes analyzing the first proposed graphical input of the printing job to identify at least one highlight area containing a plurality of halftone graphical elements in the first proposed graphical input, determining an amount of white space between the plurality of the halftone graphical elements in the first proposed graphical input, assigning at least one graphical element to be placed in a spatial relationship with each of the plurality of the halftone graphical elements, generating a second proposed graphical input by placing the at least one graphical elements on the first proposed graphical input based on the respective assignment, and instructing the flexographic printing device to print the second proposed graphical input.

23 Claims, 15 Drawing Sheets

600

SYSTEMS AND METHODS FOR IMPROVED FLEXOGRAPHIC PRINTING WITH REDUCED MOTTLING AND INCREASED HIGHLIGHT STABILITY

CROSS REFERENCE TO RELATED APPLICATIONS

This application claims priority to U.S. Provisional Application No. 62/807,424 filed on Feb. 19, 2019, which is hereby incorporated by reference in its entirety.

FIELD OF INVENTION

The invention relates to algorithms used to create halftone screens for the flexographic printing process.

BACKGROUND OF THE DISCLOSURE

Flexographic printing is a process that uses polymer printing plates wherein the image to be printed is raised from the surface of the plate in order to make physical contact with the printing substrate, thereby transferring the ink. The flexographic printing process faces many challenges associated with the quality of the finished product because small elements are hard to capture within the physical structure of the plate material. The relatively recent introduction of flexographic computer to plate devices has improved or eliminated many of the imaging problems that were once associated with film imaging prior to manual exposure of a flexographic plate. However, there is still much that can be accomplished, particularly where "halftone" imagery is involved.

A halftone is an image (such as a photograph) that has been converted into a series of graphical elements (e.g., dots) that may vary in size and spacing. Halftones are used in all forms of printing because it is not possible to reproduce continuous tones in any form of lithography or flexography. The process of breaking up images into halftone graphical elements is also referred to as screening. In some known printing workflows, a job to be printed is composed in a software program known as a layout application or design application, and is then submitted to another software program called a raster image processor ("RIP"). The RIP analyzes the job composed in the layout application or design application and "screens" any image data it finds. As used herein, "screening" includes breaking the image into a series of halftone graphical elements according to instructions programmed into the RIP. The size of each halftone graphical element may be determined by the resolution of the computer to plate device ("CTP device") that is used to create the printing plate. In at least one example, it may take fewer than 16 pixels aligned in a group to create the smallest halftone graphical element.

The RIP then sends the job data to a CTP device that uses a laser to expose the job onto a printing plate. In the case of a flexographic plate, the laser hardens the plate material wherever the exposure occurs. Once complete, the plate is put into a processing unit that washes away any un-exposed areas, leaving the exposed, hardened areas in relief.

Flexographic printing is increasingly popular and used in a variety of applications including labels, packaging, corrugated, and others where the substrate cannot be printed on an offset printing press (e.g., specially coated papers, plastics, foils, etc.). However, the challenges in flexographic printing make certain kinds of printing unusually difficult to do. Two problem areas that dominate flexographic printing are highlights, where there are very few halftone graphical elements in a given area, and shadows where many halftone graphical elements populate the area and form solids.

Highlight areas can be defined as image areas that have very little detail in the subject matter, such as clouds in the sky or light reflecting off of a shiny surface. Highlight areas are difficult to reproduce because of the small number and size of halftone graphical elements used to create the imagery. Once those graphical elements are reproduced on the plate, they frequently do not pick up enough ink to transfer to the substrate, which means the printed piece does not faithfully reproduce the artwork of the original job.

A shadow area is a part of an image that is very dark. In a halftone, these are typically represented by large graphical elements that are very close together, often creating a solid area where there is no space between the graphical elements. In flexographic printing the plate can often pick up too much ink, which can create a mottling or pooling effect in shadow areas.

As a result of these issues, known methods of flexographic printing are frequently unable to accurately render highlights and shadow areas. Accordingly, improved methods of flexographic printing are desired that will overcome these problems

BRIEF SUMMARY OF THE INVENTION

In one aspect, a method of improved screening to increase stability in flexographic printing is provided. In the example embodiment, the method is performed by a flexographic printing system. The flexographic printing system includes a computer system and a flexographic printing device. The computer system includes a memory device and a processor. The computer system is in communication with the flexographic printing device. The processor is configured to perform the method comprising receiving a first proposed graphical input of a printing job, analyzing the first proposed graphical input of the printing job to identify at least one highlight area containing a plurality of halftone graphical elements in the first proposed graphical input, determining an amount of white space between the plurality of the halftone graphical elements in the first proposed graphical input, assigning at least one graphical element to be placed in a spatial relationship with each of the plurality of the halftone graphical elements, generating a second proposed graphical input by placing the at least one graphical elements on the first proposed graphical input based on the respective assignment, and instructing the flexographic printing device to print the second proposed graphical input.

In another aspect, a method of improved screening to reduce mottling in flexographic printing performed by a flexographic printing system is provided. In the example embodiment, the method is performed by a flexographic printing system. The flexographic printing system includes a computer system and a flexographic printing device. The computer system includes a memory device and a processor. The computer system is in communication with the flexographic printing device. The processor is configured to perform the method comprising receiving a first proposed graphical input of a printing job, identifying at least one high density region in the first proposed graphical input, identify at least one candidate pixel within each of the at least one high density regions, removing each of the at least one candidate pixels from the first proposed graphical input to create a second proposed graphical input, and instructing the flexographic printing device to print the second proposed graphical input.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings, wherein:

FIGS. 11A-C illustrate the design of dot shapes using the dot design tool wherein FIG. 11A shows an initial design using the dot design tool, FIG. 11B shows a rendered design, and FIG. 11C shows the use of the designs rendered by the dot design tool in FIG. 11B to perform the functions described herein.

DETAILED DESCRIPTION

Figure 1:
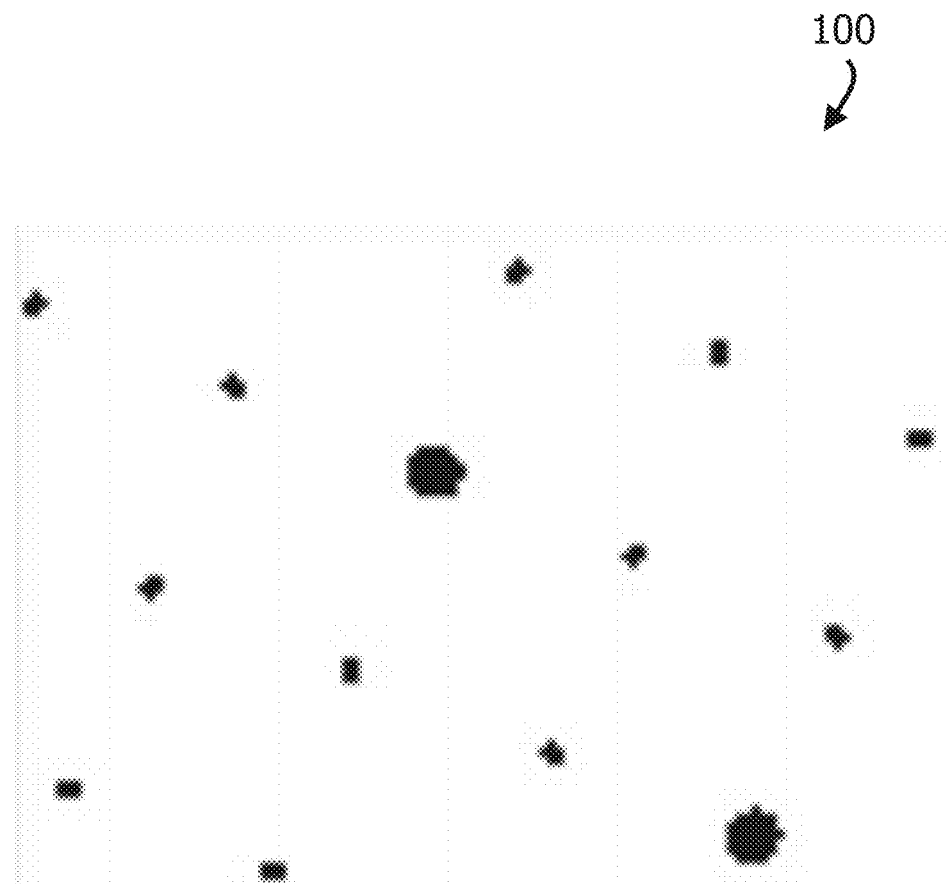
FIG. 1 illustrates additional dots of various sizes being placed in the white space surrounding the organic or naturally printing halftone dots.

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the preferred methods and materials are described below.

It is the object of this disclosure to describe a screening method, either as a halftone algorithm inside a RIP, or as a stand-alone computer application using the algorithm for the express purpose of creating halftones out of continuous tone images, that takes into account the issues of highlight and shadow reproduction, resulting in faithful and predictable flexographic printing.

The screening method is implemented using a flexographic printing system. "Flexography" is the process of printing using flexible plates. A brief summary of the process follows. Flexography is a technology necessary in order to print on substrates beyond standard paper. Packaging, labels, corrugated materials, and plastics are difficult, if not impossible to print using metal plates in a sheet-fed offset printing press. Almost always, the substrate upon which the content is printed comes from a large roll and is fed through a flexographic printing press (also known as a "flexo printing press") in continuous form, called a "web".

The roll is then typically taken up in roll form at the opposite end of the press and moved to converting equipment for further processing into individual pieces. In some cases, the converting equipment is attached to the press and the web is converted into individual pieces in-line.

Inside the press itself, the process of applying ink differs greatly from offset technology. In flexography, a fountain roller revolves through the ink fountain, collecting ink across its surface. A fine blade, called a doctor blade, removes most of the ink, leaving a fine layer. It then comes in contact with the anilox roller, which is engraved with tiny cells that collect the ink in its concave surfaces. The anilox then contacts the surface of the flexographic printing plate, transferring a measured amount of ink to the plate. When the plate contacts the substrate, the image is transferred or "printed."

Certain products present significant problems for the printing process, including plastics, such as those used to create packaging bags for food and household products. Some such substrates, such as plastic substrates, have difficulty with ink adherence. Further, some substrates are transparent or translucent and which makes color fidelity, accuracy, and density difficult to achieve.

Addressing issues of printing onto challenging substrates, such as plastics, is difficult to achieve using known methods. For example, one possible approach to addressing a substrate with poor ink adherence is to saturate the substrate with more ink, to compensate for the poor adherence. However, this technique is ineffective. Rather, if a printing press operator (known as a "pressman") tries to apply more ink in order to maintain saturation, the ink pools or mottles which creates blurred or distorted printing. Further, if additional colors are part of the design, the increased levels of ink can further complicate the process because the resulting color may be improper and the image may be blurred or distorted. Further, a layer of white ink is normally applied in the shape of the overall design before applying the other colors in order to heighten fidelity. This approach adds to the pooling problem unless properly controlled and can add to or cause undesirable results.

Images and designs to be printed must move from a digital layout (defined by a creator such as a graphic designer) to the printing plate through a series of steps known as prepress workflow or, "prepress" for short. These steps include (a) "rasterization" through a "raster image processor", or "RIP"; (b) digital separation of the colors to be printed so that each one has its own printing plate; (c) screening, which converts images into a series of halftone dots; and (d) exposure of the flexographic plate on a computer-to-plate ("CTP") engine that uses finely tuned lasers focused on the plate material. The resulting plates are then mounted on the cylinders of the printing press.

One of the most important aspects in this process is the screening step because of its relationship with the anilox rollers on the press. Anilox rollers measure ink disbursement based on the size, shape, and depth of the cells engraved in its surface. Since anilox directly contacts the printing plate during the printing process, the height, placement and sturdiness of the halftone dots on the plate (created by the screening process) determine the printability and color accuracy of the job.

Properly tuning the screening in relation to the anilox roller, plate, substrate, and press conditions is intended to provide some of the following: (a) better density and coverage; (b) higher fidelity and color accuracy; (c) proper rendition of highlight areas; (d) sharpness of the printed image; (e) less ink pooling and mottling of the printed image; and (f) better coverage at lower anilox cell volumes and higher screen frequencies resulting in ink savings. Nevertheless, these features are difficult to provide reliably on many substrates for the reasons described above.

As described in detail below and herein, the disclosed invention describes a screening technology that reliably provides the features desired in flexographic printing. As such, a pressman can used the disclosed invention to apply settings to provide these key desired features in printing. One example of the described technology is SmartFlexo included within Navigator Flexo Suite. As described herein, the disclosed invention provides features to allow a pressman (or another user) to produce stable flexographic printing on a variety of substrates with high quality density, coverage, fidelity, color accuracy, sharpness, and high quality highlight rendition without pooling or mottling. Notable features include the ability to set the changeover point to switch between amplitude modulation ("AM") and frequency modulation ("FM") techniques to control mottling and screening from mid-tones, quartertones, highlights, and shadows. The disclosed flexographic printing system also provides methods for stabilizing highlight areas to prevent fine highlight dots from collapsing on the plate due to the physical pressures applied by the press rollers.

The flexographic printing system also provides a means to remove pixels in mid-tone, shadow and solid areas to prevent ink pooling using, for example, AM and FM techniques. When removing pixels from halftone dots, the flexographic printing system also provides a means to protect the edges of the dots from cell removal so that dot edges remain crisp and clear. Because the disclosed flexographic printing system provides control over all of these critical areas, prepress operators can customize the settings across the screening spectrum, from 0% to 100%. (In printing, images are screened with half-tone dots. At a level of 0%, there are no dots used and at 100% the image is entirely populated with dots.)

The disclosed flexographic printing system provides significant advantages over known screening technologies that may provide choices only among pre-programmed groups of settings. Such technologies are not suitable for providing robust printing support on a variety of substrates. As such, the disclosed systems and methods for flexographic printing address known technological problems in printing and publication related to difficulties in producing printings on a variety of substrates using flexographic printers. The systems and methods resolve these problems using technical solutions described herein including, notably, altering graphical inputs to include graphical elements for enhanced stability, quality, and definition of printing.

In the example embodiment, the flexographic printing system includes at least a computer system and a flexographic printing device. The computer system includes at least a memory device and a processor, and is in networked communication with the flexographic printing device. The flexographic printing device is configured to receive the screened, rasterized file in one-bit TIFF format from the computer system and use a laser to expose the rasterized image data on a flexographic printing plate mounted within the flexographic printing device, commonly called a flexographic computer to plate imager. The processor is configured to run instructions on the computer system and, thereby, to implement the screening method using the computer system and the flexographic printing system.

In one aspect, the computer system is configured to receive a first proposed graphical input of a job to be printed, and to apply the screening method by analyzing the amount of white space between halftone graphical elements in highlight areas. In the example embodiment, the analyzed amount of space is measured in any suitable manner including, pixel area, or physical area. The first proposed graphical input may be received by any suitable input including a scanner, desktop publishing software, illustrator software, an external camera, or any other suitable input. In the example embodiment, the computer system analyzes the amount of white space by first identifying highlight areas that are indicated based upon a lack of enabled pixels and a threshold level of pixel density. The amount of white space can be determined based on the resolution of the computer to plate device, which is expressed as pixels per inch, dots per inch, or dots per centimeter.

Upon such analysis and identification of at least one highlight area, the computer system is configured to assign graphical elements to be placed in a spatial relationship with each analyzed halftone dot within each identified highlight area. In some examples, the graphical elements consist of other dots or vector-based elements. The graphical elements may have various sizes that are predetermined based on image density. Therefore, in assigning the graphical elements, the computer system also determines at least one shape for the graphical elements sufficient to associate a shape for each of the assigned graphical elements. Similarly, the computer system determines a size for each graphical element. The computer system is configured to select the shape and size of graphical elements based on output resolution, on the substrate used for the printed job, the press conditions, and the anilox roller line screen in use. The computer system is also configured to assign the graphical elements to be placed in a spatial relationship with each analyzed halftone dot, such that the spatial relationship causes the graphical elements to provide proper density to the printed image sufficient to render the highlighted area.

In some examples, the computer system analyzes the amount of white space, and assigns graphical elements, using a first algorithm. The algorithm may factor in inputs set by an operator.

Based on the above, graphical elements such as additional dots of various sizes are placed in spatial relation with the halftone dots within the identified highlighted areas on the first proposed graphical input. Upon printing, some of the graphical inputs will pick up ink and some of which will not. The computer system is further configured to instruct the flexographic printing device to render a printing using a second proposed graphical input consisting of at least the first proposed graphical input that is revised to include the assigned graphical elements.

In the example embodiment, a suitable amount of ink is picked up and transferred to the substrate for a faithful reproduction of the image, due to the plate's ability to "hold" the printed versions of the graphical elements.

In some examples, other controls will allow the computer system to assign varying levels of additional graphical elements that are increasingly larger, based on an assigned minimum size of the graphical elements. In this way, highlight areas can be fine-tuned to reproduce properly regardless of plate type or substrate being used as some plates are conditioned for longer press runs than others and different substrates absorb inks at different levels.

In another aspect, the computer system of the flexographic printing system is configured to identify solid and near-solid areas that are likely to result in over-inking, or mottling on the substrate. Mottling is undesirable because it results in inaccurate image transfer. In other words, the computer system is configured to receive a first proposed graphical input of a printing, and to identify high density regions in the first proposed graphical input with high densities of activated pixels. The computer system is configured to remove pixels from the dense ink coverage areas (referred to as "zones"). More specifically, the computer system is configured to identify candidate pixels (and locations associated with the candidate pixels) within the high density regions for depopulating. The computer system is also configured to alter the first proposed graphical input to a second proposed graphical input by removing the candidate pixels from the high density regions. The computer system is also configured to render a printing using the second proposed graphical input and the flexographic printing device. By removing the candidate pixels, the computer system and the flexographic printing system are configured to provide better ink transfer to the substrate with no mottling or pooling. In some examples, the "zones" can be defined by the operator as a range from X % to 100%, where "X" is the starting density value and 100% is the ending value. In other examples, the zones are defined programmatically based on a programmatic identification normal density values throughout the first proposed graphical input, and a comparison between such normal density values to each of a series of identified density values for each candidate zone. In other words, the zones may be identified based upon their deviation from the normal density of the graphical inputs.

In another aspect, the computer system of the flexographic printing system is further configured to control mottling by using amplitude modulation ("AM") and frequency modulation ("FM") techniques. In such examples, the computer system is configured to create geographic "cells" within the first graphical input that define regions of fixed width and height. In the example embodiment, "cells" are designed to be smaller than zones, and of regular dimensions. The computer system is thus configured to identify candidate pixels for removal based on an AM or an FM technique. When the computer system applies an AM technique, it uses a fixed, uniform distance between halftone dots to identify candidate pixels. When the computer system applies an FM technique, it identifies randomly placed halftone dots of various sizes as candidate pixels. In other examples, candidate pixels can be identified in a uniform, structured manner with square shaped pixel regions (1 pixel×1 pixel, 3 pixels×3 pixels) or irregular shaped pixel regions (1 pixel×3 pixels, 3 pixels×4 pixels, 3 pixels×7 pixels, etc.).

In further examples, the computer system is configured to provide control over the depopulation of pixels or cells. In some examples, the depopulation can be throttled by the user and set from low to high based on numerical input by the operator, or based on pre-defined thresholds.

If pixels are depopulated indiscriminately, it is possible to remove cells that would make up the edge of a halftone dot. This would cause the dot to appear to have rough or jagged edges, which is undesirable and impairs image quality. To protect the integrity of the outer edge of halftone dots (smooth edges), the computer system is configured to provide "edge protection". In such examples, the computer system will not remove candidate pixels that are within a pre-defined distance from the edge of a particular halftone dot. The dot shapes used in flexographic printing are very specific and used in correlation with the number of ink cells in the anilox rollers. If the dot shape is impaired due to the loss of edge definition, unwanted image anomalies will appear in the printed piece and the quality of the reproduction will suffer.

Figure 10:
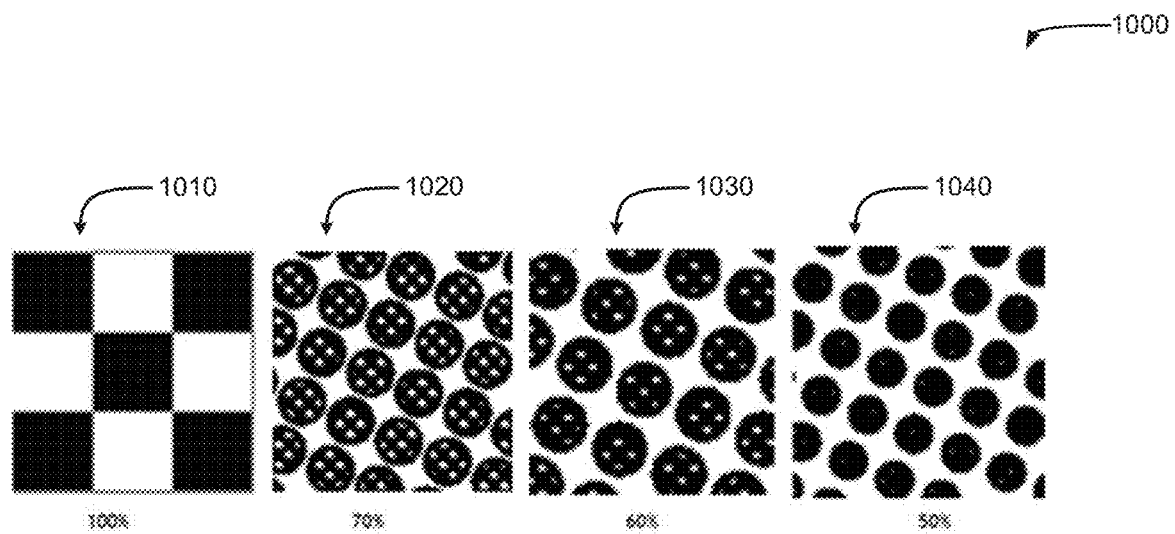
FIG. 10 illustrates cell size auto adjusting based on gray levels.

In another example, the size of cells can be set to automatically adjust according to gray-level changes so that gradient tints appear smoother when printed as shown in FIG. 10. As the halftone dots get smaller, fewer and fewer cells are removed automatically. The visual result when printed is a smooth gradient as opposed to appearing with visual "bands" as the gray level changes.

In another aspect, the computer system of the flexographic printing system allows the graphical elements to be specifically generated using a graphical interface. More specifically, the computer system allows for user-input to define a particular shape, size, and orientation of the graphical elements. By outlining the basic shape desired in a pixel level grid, the computer system allows the dot shape to be imaged from 0% through 100% values. This allows the computer system to create dot shapes specific to their needs as defined by printing plates, plate processing, exposures, and/or imaging through flexographic computer to plate engines.

There are several possible ways in which the described flexographic printing systems can be introduced to a prepress workflow. In an example embodiment, such as the SmartFlexo embodiment, the flexographic printing system does not require its own proprietary raster image processor ("RIP") and workflow in order to function, unlike other known screening technologies.

The flexographic printing system may be provided according to several embodiments, or combinations thereof. In one embodiment, the flexographic printing system is provided using software that is a separate, standalone application that typically functions after the rasterization (or RIP) stage of prepress process. In this embodiment, any RIP may be used to process a design file input which is typically interpreted and rasterized into separated and un-screened monochrome (one-bit) TIFF files, also known as a monochrome continuous tone (contone) file. In some examples, such separated contones are provided to the flexographic printing system software. In one example, the separated contones are written to a location (e.g., a file folder) that is monitored by the flexographic printing system software. When the separated contones are received (e.g., when files arrive in a monitored folder or when the files are sent to the flexographic printing system software), the flexographic printing system software automatically screens each contone using the settings applied by the prepress operator. The result is one screened one-bit TIFF file for each color used in the design file. Such files are automatically written to an electronic folder that is monitored by a plate assembly application prior to release to the CTP engine for plate imaging.

In another example, the RIP is instructed to interpret the design file and output an un-screened, un-separated contone. The flexographic printing system software separates the resulting file into each color contained within, and then screen the separations according to the settings applied by the prepress operator. The result is one screened one-bit TIFF file for each color used in the design file. These files are automatically written to an electronic folder that is monitored by a plate assembly application prior to release to the CTP engine for plate imaging.

A significant benefit from these approaches is that a flexographic printer does not need to acquire a new system, and can improve output through the addition of screening tools.

In another embodiment, the software for the flexographic printing system is included within RIP software, such as Xitron's Navigator Harlequin RIP. In one example of this embodiment, an application programming interface ("API") for the flexographic printing system software is used to instruct the Harlequin RIP to access screening algorithms and operator settings so that the design files are separated and screened during the RIP step of the prepress process. In this implementation, the RIP outputs the screened, separated one-bit TIFF files directly. As a result, in this example, there is no need to queue files to the stand-alone screening application using, for example, a monitored folder. Instead, the RIP outputs the separated, screened one-bit TIFF files. The files may be written to an electronic folder that is monitored by the plate assembly application prior to release to the CTP engine for plate imaging.

A significant benefit of this approach is that there are significant numbers of legacy RIPs (such as Harlequin RIP) in active deployment. As such, users with such legacy software may be able to benefit from the disclosed flexographic printing systems by upgrading their legacy RIP software to include the software for the flexographic printing system in order to take advantage of the screening technology.

In another embodiment, the software for the flexographic printing system is embedded into a workflow application that handles multiple prepress steps inside its overall architecture. In this implementation, all prepress steps such as preflighting, ink remapping, RIPing, proofing, screening, plate assembly, and plate cutting data export are controlled through a single application using a single graphical user interface (GUI), instead of several disparate applications.

In such an implementation, the integrated work flow software provides a GUI that allows the operator to design workflow processes with specific settings for each step, depending on the type of job, substrate, screening necessary and press characteristics. In this implementation, either the stand-alone screening application or the RIP-integrated screening module could be used.

A benefit of this implementation is that a flexographic printing organization can procure and utilize a single unified system for prepressing, thereby eliminating many of the steps requiring manual intervention by the prepress operators, saving time and increasing throughput and overall productivity.

FIG. 1 illustrates additional dots 100 of various sizes being placed in the white space surrounding the organic or naturally printing halftone dots.

Figure 2:
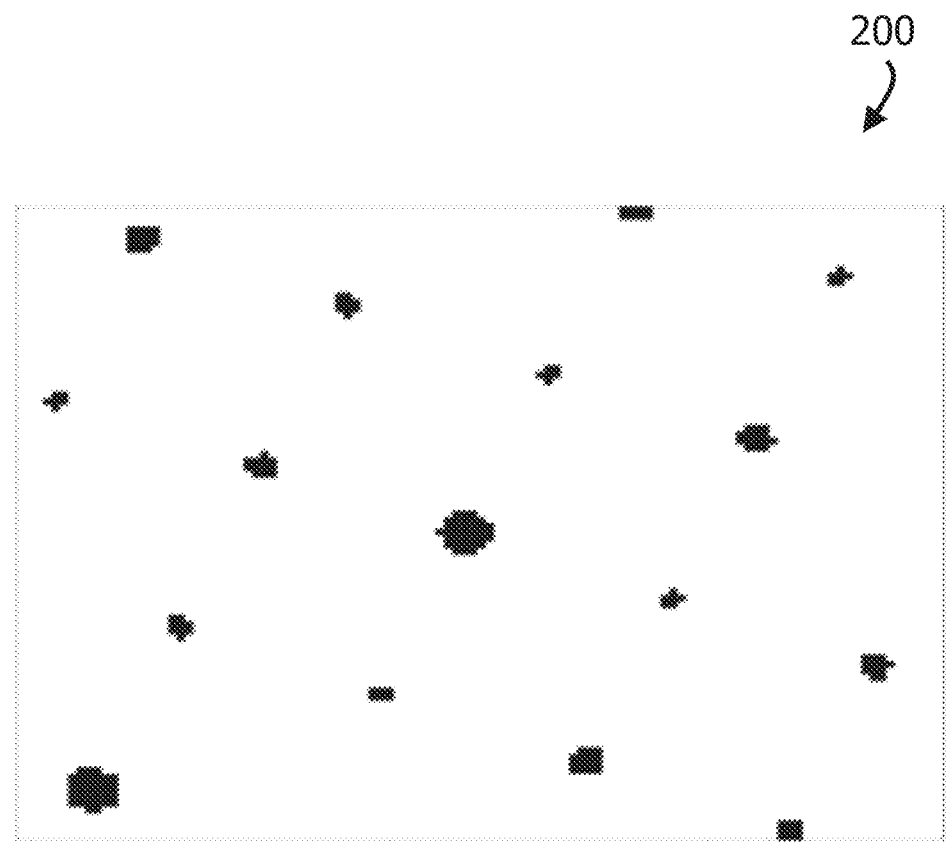
FIG. 2 illustrates a selected higher level of additional dots placed in the white space surrounding the organic or naturally printing halftone dots.

FIG. 2 illustrates a selected higher level of additional dots 200 placed in the white space surrounding the organic or naturally printing halftone dots.

Figure 3:
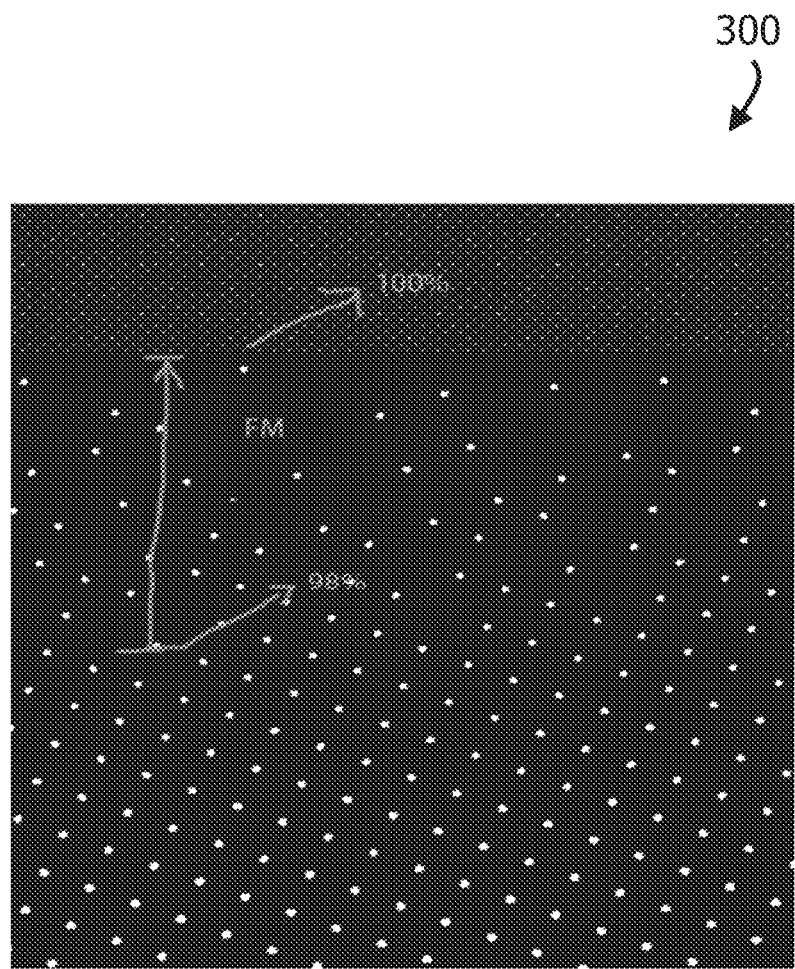
FIG. 3 illustrates the zone within which the screening method begins removing pixels in solid areas to provide better ink coverage in near-solid to solid areas.

FIG. 3 illustrates the zone 300 within which the screening method begins removing pixels in solid areas to provide better ink coverage in near-solid to solid areas.

Figure 4:
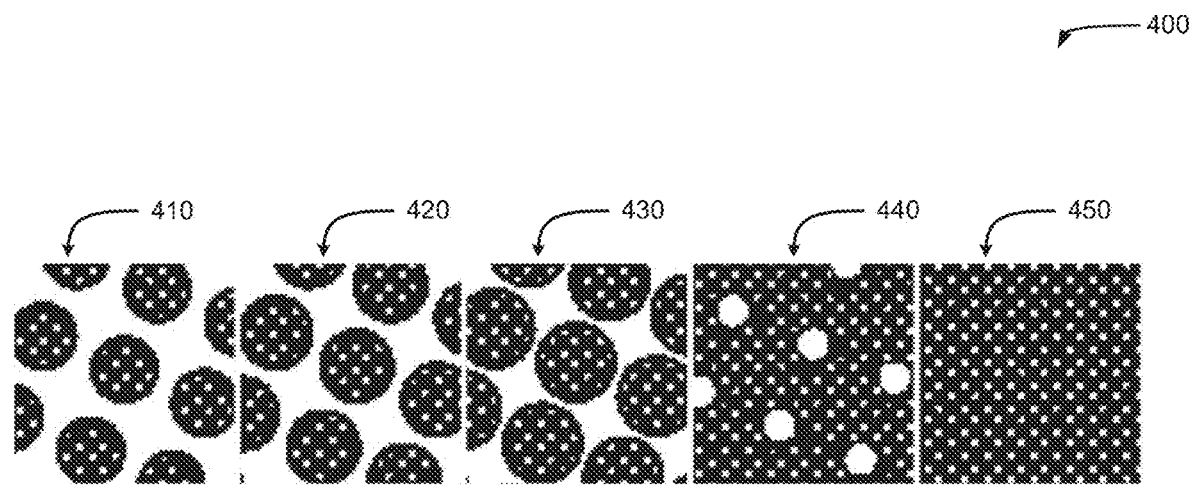
FIG. 4 illustrates the effect of selected AM dot pixel removal in a zone.

FIG. 4 illustrates a series of drawings 400 showing effect of selected amplitude modulation ("AM") dot pixel removal in a zone. Notably, progressing from drawings 410 to 420 to 430, dot pixels are shown removed from exemplary highlight dots using an AM approach. Drawings 440 and 450 provide a zoomed in illustration of highlight dots with dot pixels removed in an AM approach.

Figure 5:
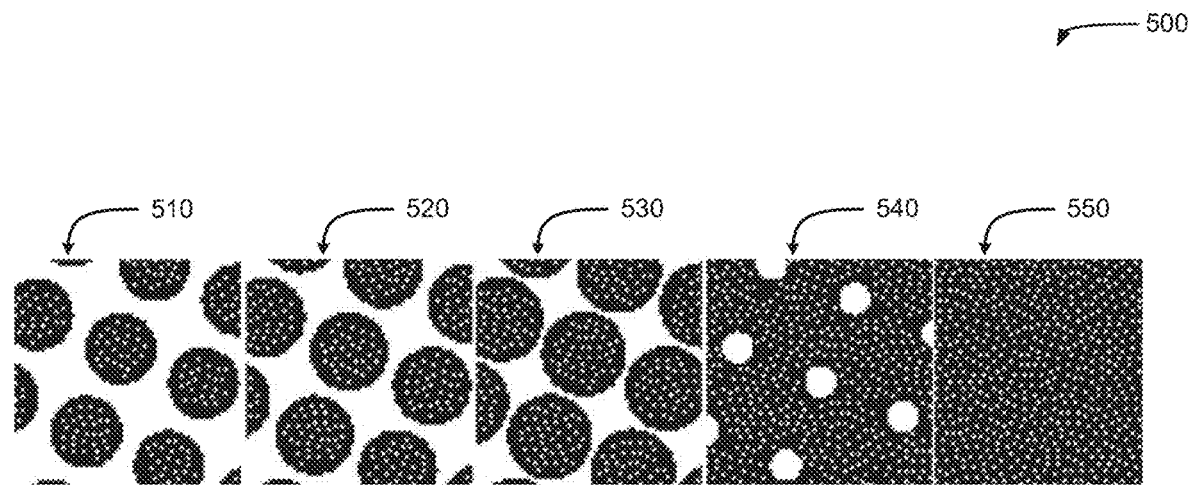
FIG. 5 illustrates the effect of selected FM dot pixel removal in a zone.

FIG. 5 illustrates a series of drawings 500 showing the effect of selected frequency modulation ("FM") dot pixel removal in a zone. Comparison of FIGS. 4 and 5 illustrates that the distinction between FM and AM techniques. Notably, progressing from drawings 510 to 520 to 530, dot pixels are shown removed from exemplary highlight dots using an FM approach. Drawings 540 and 550 provide a zoomed in illustration of highlight dots with dot pixels removed in an FM approach. When the computer system (shown in FIG. 12) applies an AM technique as shown in FIG. 4, it establishes a fixed, uniform distance to identify candidate pixels for removal that are then removed. When the computer system applies an FM technique as shown in FIG. 5, it identifies randomly placed halftone dots of various sizes as candidate pixels. As a result, illustrations 410, 420, 430, 440, and 450 indicate a removal of candidate pixels at separated by fixed, uniform distance. By contrast, illustrations 510, 520, 530, 540, and 550 indicate a removal of candidate pixels according to a random pattern. In other examples, candidate pixels can be identified in a uniform, structured manner with square shaped pixel regions (1 pixel×1 pixel, 3 pixels×3 pixels) or irregular shaped pixel regions (1 pixel×3 pixels, 3 pixels×4 pixels, 3 pixels×7 pixels, etc.).

Figure 6:
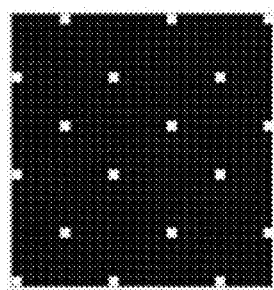
FIG. 6 illustrates the effect of uniform pixel removal.

FIG. 6 illustrates the effect of uniform pixel removal. In zone 600, the removed pixels are separated by fixed, uniform distances.

Figure 7:
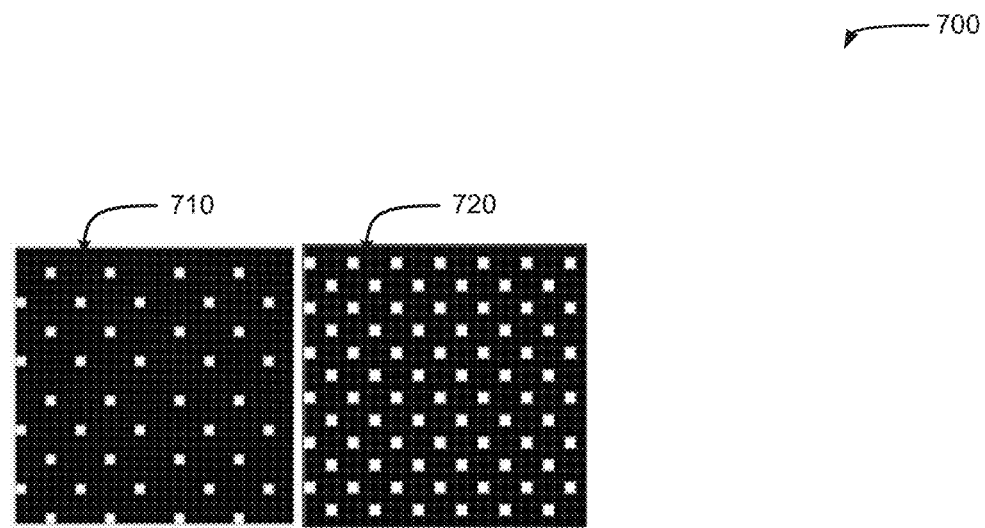
FIG. 7 illustrates the effect of higher density pixel removal.

FIG. 7 illustrate a series 700 of drawings 710 and 720 showing the effect of higher density pixel removal. In drawing 710, a first level of uniform pixel removal is shown where the removed pixels are separated by fixed, uniform distances. In drawing 720, a higher amount of pixel are removed within the same graphical region. Nevertheless, drawing 720 displays removal of pixels according to fixed, uniform distances.

Figure 8:
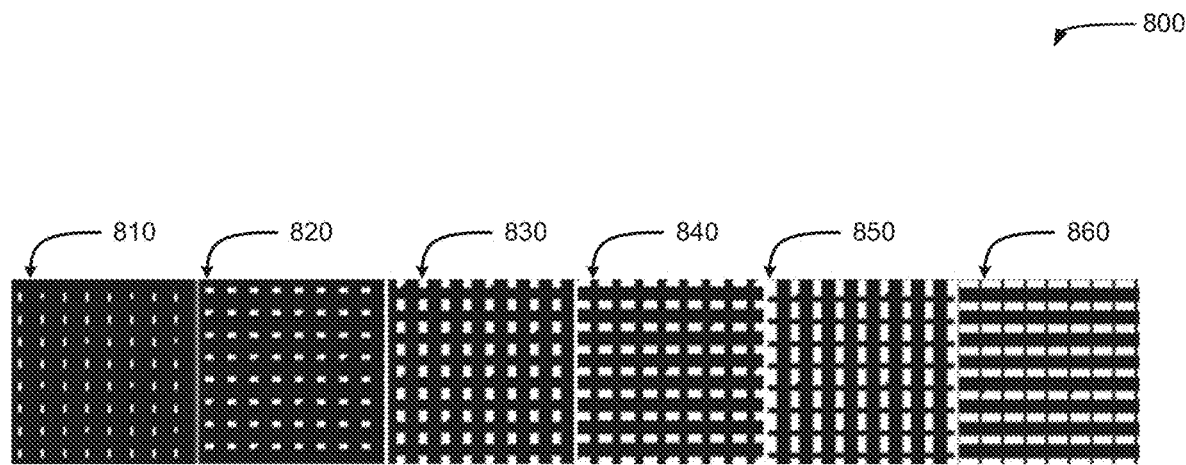
FIG. 8 illustrates the effect of irregular pixel removal.

FIG. 8 illustrates a series 800 of drawings 810, 820, 830, 840, 850, and 860 showing the effect of irregular pixel removal. In each of drawings 810, 820, 830, 840, 850, and 860, pixels are removed with irregular shapes from the graphical elements such that some graphical elements are unaffected from removal while other similar elements have several pixels removed.

Figure 9:
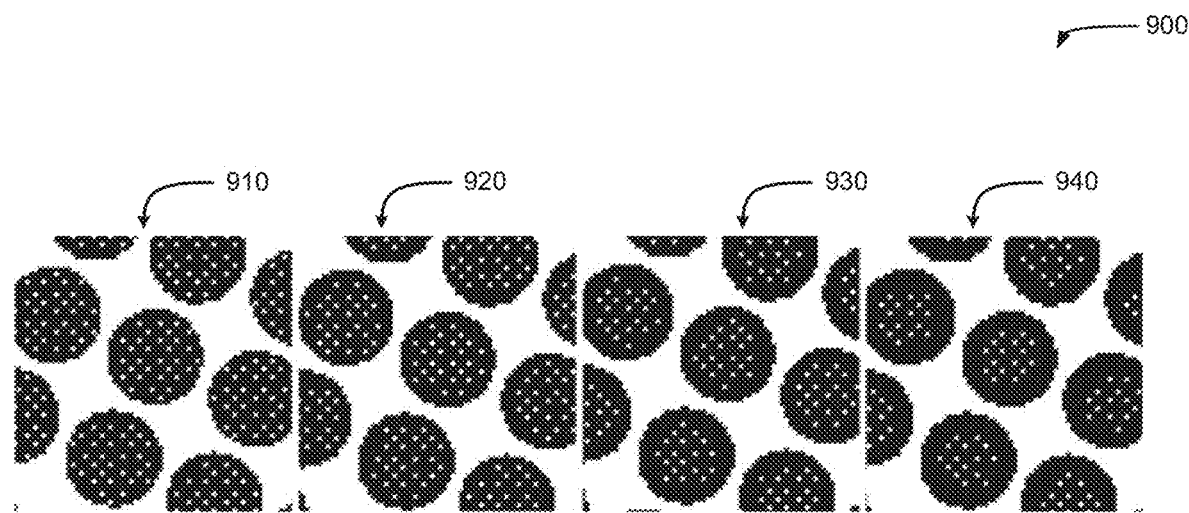
FIG. 9 illustrates the effect of halftone dot edge protection during pixel removal.

FIG. 9 illustrates a series 900 of drawings 910, 920, 930, and 940 showing the effect of halftone dot edge protection during pixel removal. As noted above, to protect the integrity of the outer edge of halftone dots (smooth edges), the computer system is configured to provide "edge protection". In such examples, the computer system will not remove candidate pixels that are within a pre-defined distance from the edge of a particular halftone dot. The dot shapes used in flexographic printing are very specific and used in correlation with the number of ink cells in the anilox rollers. If the dot shape is impaired due to the loss of edge definition, unwanted image anomalies will appear in the printed piece and the quality of the reproduction will suffer. As such, in drawings 910, 920, 930, and 940 pixels are not removed when they are relatively close to the edge. Notably, moving from 910 to 920 to 930 to 940, an increasing amount of edge protection is shown.

FIG. 10 illustrates cell size auto adjusting based on varying gray levels. Specifically, FIG. 10 shows a series 1000 of drawings 1010, 1020, 1030, and 1040 at decreasing gray levels. As noted herein, the size of cells can be set to automatically adjust according to gray-level changes so that gradient tints appear smoother when printed as shown in FIG. 10. As the halftone dots get smaller, fewer and fewer cells are removed automatically. The visual result when printed is a smooth gradient as opposed to appearing with visual "bands" as the gray level changes.

Figure 11A:
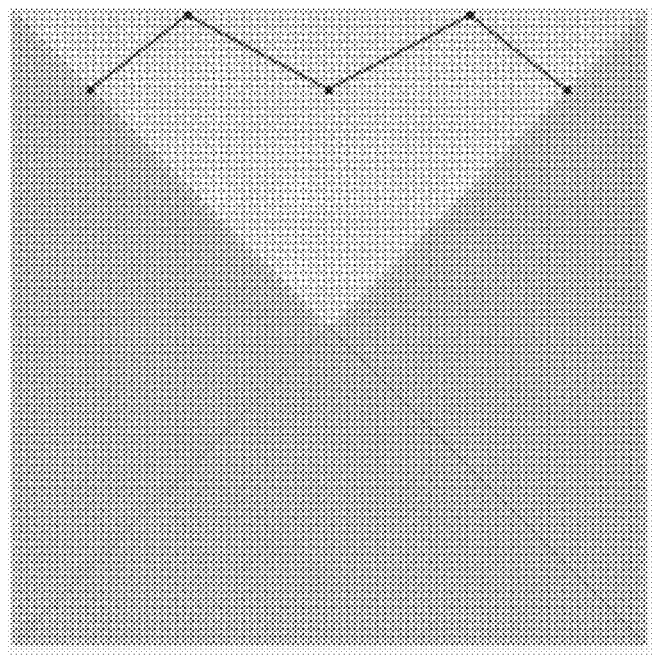
Figure 11B:
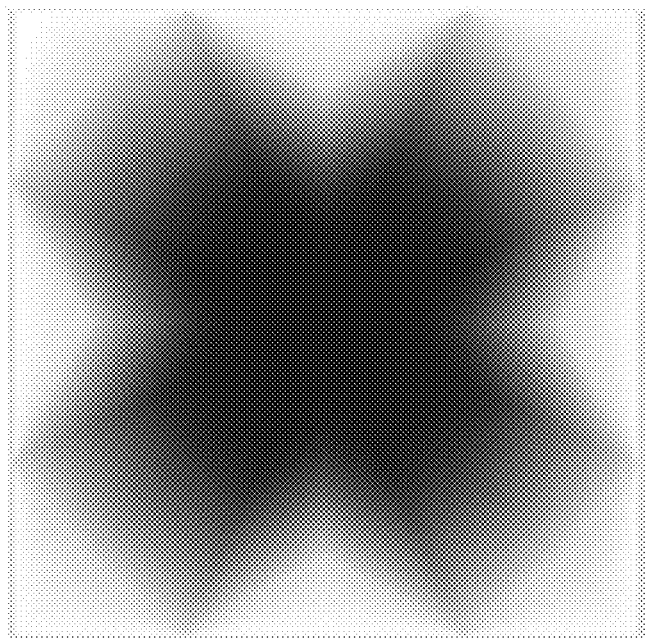
Figure 11C:
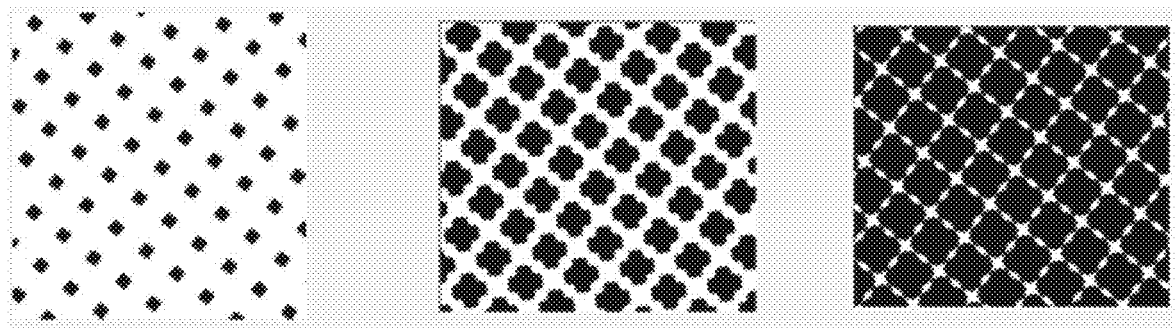

FIGS. 11A-C illustrate the design of dot shapes using the dot design tool wherein FIG. 11A shows an initial design 1110 using the dot design tool, FIG. 11B shows a rendered design 1120, and FIG. 11C shows applications 1130 of the designs rendered by the dot design tool in FIG. 11B to perform the functions described herein.

Figure 12:
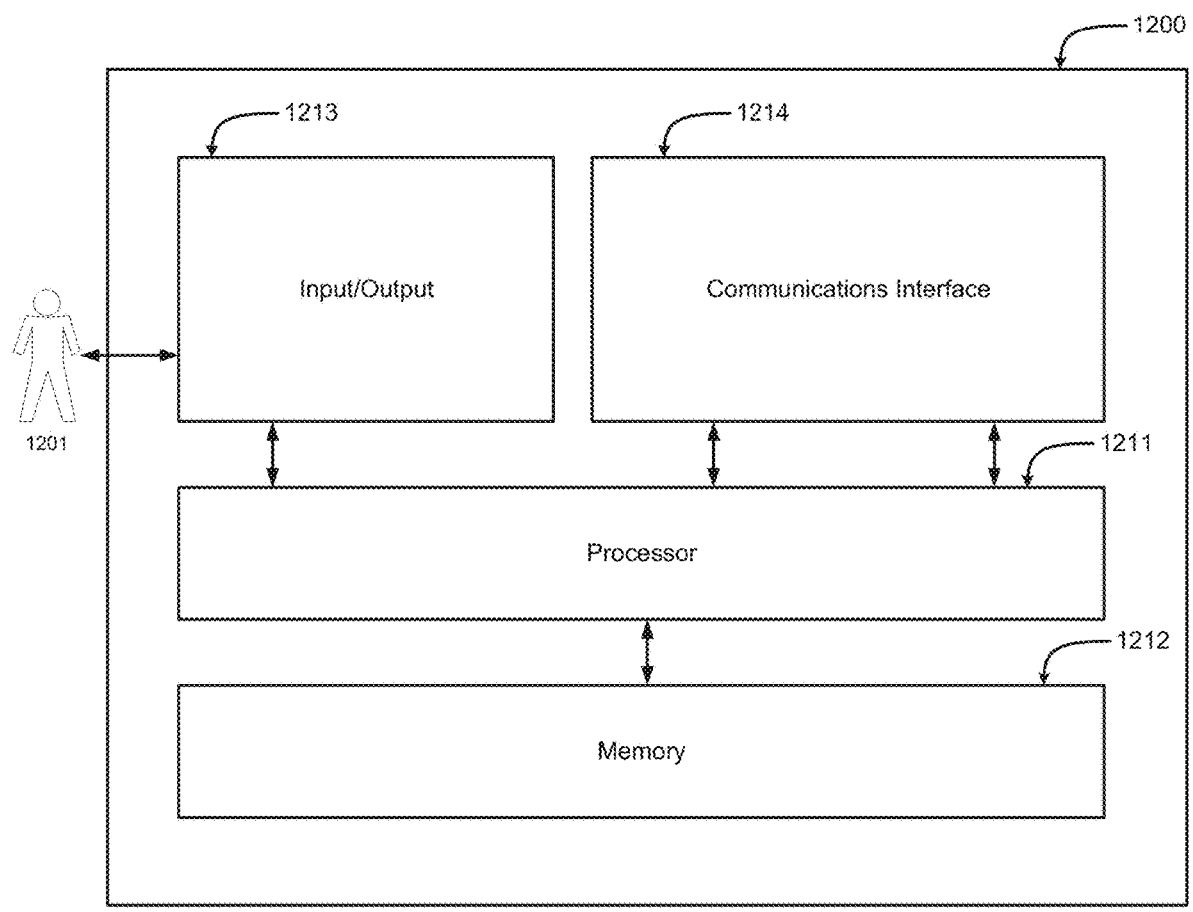
FIG. 12 is a functional block diagram of an example computing device that may be used in the flexographic printing systems described.

FIG. 12 is a functional block diagram of an example computing device 100 that may be used in the flexographic printing systems described. Specifically, computing device 1200 illustrates an exemplary configuration of a computing device for the systems shown herein. Computing device 1200 illustrates an exemplary configuration of a computing device operated by a user 1201 in accordance with one embodiment of the present invention. Computing device 1200 may include, but is not limited to, the flexographic printing system and any related systems including systems for prepress workflows, rasterization, and design, other user systems, and other server systems. Computing device 1200 may also include mobile computing devices, stationary computing devices, computing peripheral devices, smart phones, and wearable computing devices. Alternatively, computing device 1200 may be any computing device capable of the flexographic printing methods described. In some variations, the characteristics of the described components may be more or less advanced, primitive, or non-functional.

In the exemplary embodiment, computing device 1200 includes a processor 1211 for executing instructions. In some embodiments, executable instructions are stored in a memory area 1212. Processor 1211 may include one or more processing units, for example, a multi-core configuration. Memory area 1212 is any device allowing information such as executable instructions and/or written works to be stored and retrieved. Memory area 1212 may include one or more computer readable media.

Computing device 1200 also includes at least one input/output component 1213 for receiving information from and providing information to user 1201. In some examples, input/output component 1213 may be of limited functionality or non-functional as in the case of some wearable computing devices. In other examples, input/output component 1213 is any component capable of conveying information to or receiving information from user 1201. In some embodiments, input/output component 1213 includes an output adapter such as a video adapter and/or an audio adapter. Input/output component 1213 may alternatively include an output device such as a display device, a liquid crystal display (LCD), organic light emitting diode (OLED) display, or "electronic ink" display, or an audio output device, a speaker or headphones. Input/output component 1213 may also include any devices, modules, or structures for receiving input from user 1201. Input/output component 1213 may therefore include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output and input device of input/output component 1213. Input/output component 1213 may further include multiple sub-components for carrying out input and output functions.

Computing device 1200 may also include a communications interface 1214, which may be communicatively coupleable to a remote device such as a remote computing device, a remote server, or any other suitable system. Communication interface 1214 may include, for example, a wired or wireless network adapter or a wireless data transceiver for use with a mobile phone network, Global System for Mobile communications (GSM), 3G, 4G, or other mobile data network or Worldwide Interoperability for Microwave Access (WIMAX). Communications interface 1214 is configured to allow computing device 1200 to interface with any other computing device or network using an appropriate wireless or wired communications protocol such as, without limitation, BLUETOOTH®, Ethernet, or IEE 802.11. Communications interface 1214 allows computing device 1200 to communicate with any other computing devices with which it is in communication or connection.

Figure 13:
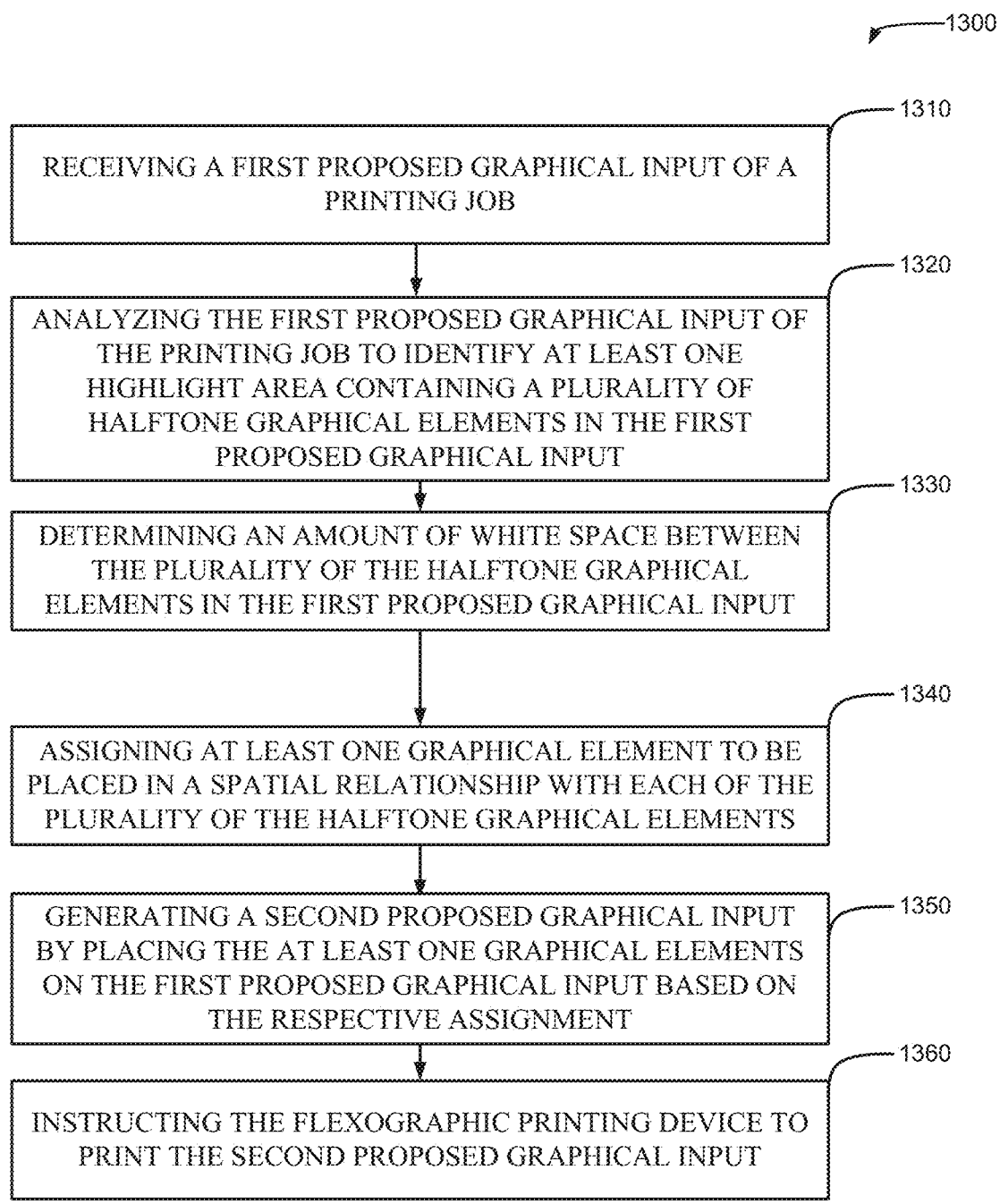
FIG. 13 illustrates a first screening method according to this disclosure.

FIG. 13 illustrates a first screening method 1300 according to this disclosure. Specifically, method 1300 is a method performed by computing device 1200. Method 1300 includes receiving 1310 a first proposed graphical input of a printing job. Method 1300 also includes analyzing 1310 the first proposed graphical input of the printing job to identify at least one highlight area containing a plurality of halftone graphical elements in the first proposed graphical input. Method 1300 additionally includes determining 1330 an amount of white space between the plurality of the halftone graphical elements in the first proposed graphical input. Method 1300 also includes assigning 1340 at least one graphical element to be placed in a spatial relationship with each of the plurality of the halftone graphical elements. Method 1300 additionally includes generating 1350 a second proposed graphical input by placing the at least one graphical elements on the first proposed graphical input based on the respective assignment. Method 1300 also includes instructing 1360 the flexographic printing device to print the second proposed graphical input.

Figure 14:
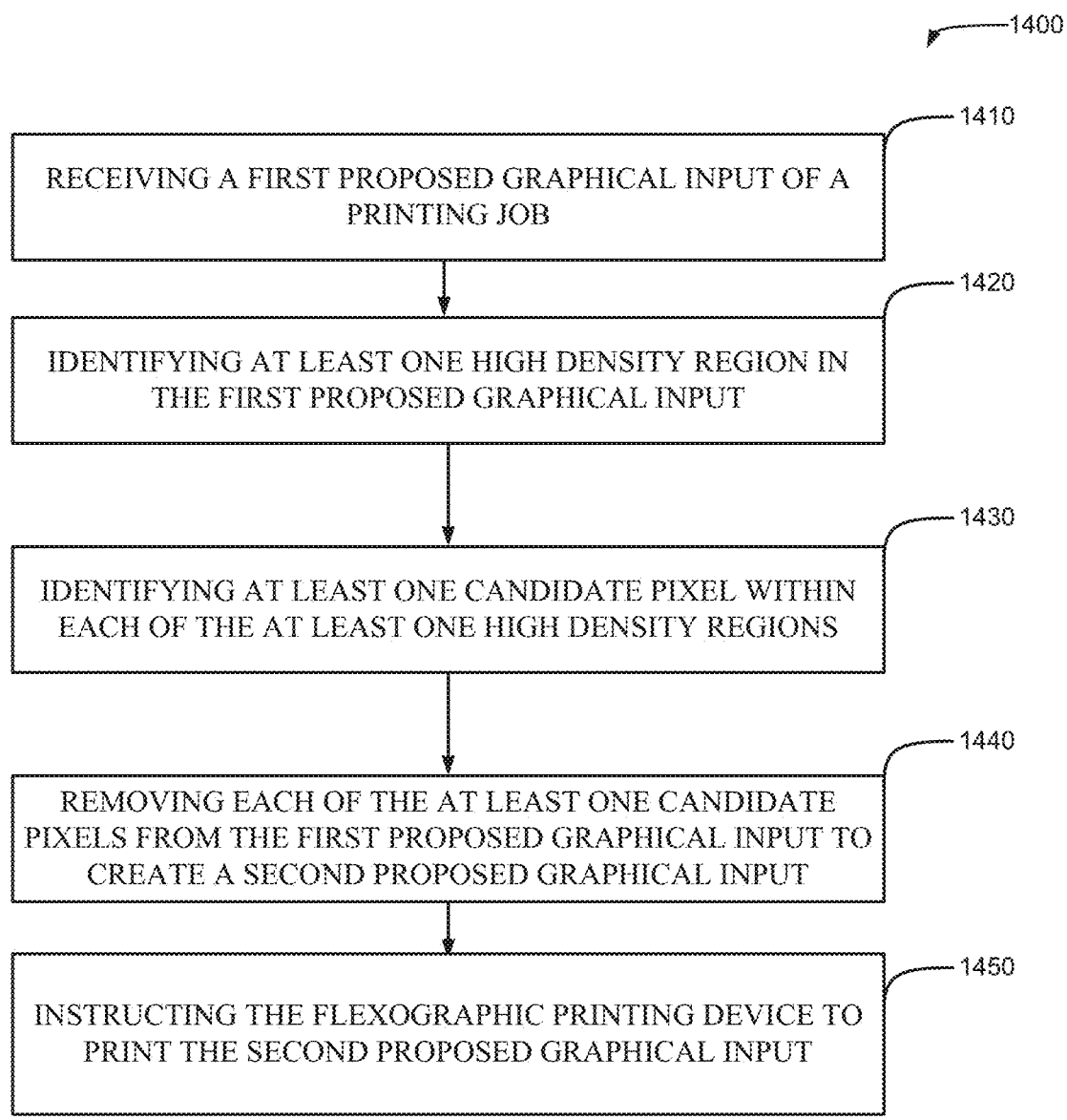
FIG. 14 illustrates a second screening method according to this disclosure.

FIG. 14 illustrates a second screening method 1400 according to this disclosure. Specifically, method 1400 is a method performed by computing device 1200. Method 1400 includes receiving 1410 a first proposed graphical input of a printing job and identifying 1420 at least one high density region in the first proposed graphical input. Method 1400 also includes identifying 1430 at least one candidate pixel within each of the at least one high density regions and removing 1440 each of the at least one candidate pixels from the first proposed graphical input to create a second proposed graphical input. Method 1400 also includes instructing 1450 the flexographic printing device to print the second proposed graphical input.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

Numbered Embodiments

In addition or as an alternative to the above, the following embodiments are described:
1. A method of improved screening to increase stability in flexographic printing performed by a flexographic printing system, the flexographic printing system including a computer system and a flexographic printing device, the computer system including a memory device and a processor, the computer system in communication with the flexographic printing device, wherein the processor is configured to perform the method comprising:
- a) receiving a first proposed graphical input of a printing job;
- b) analyzing the first proposed graphical input of the printing job to identify at least one highlight area containing a plurality of halftone graphical elements in the first proposed graphical input;
- c) determining an amount of white space between the plurality of the halftone graphical elements in the first proposed graphical input;
- d) assigning at least one graphical element to be placed in a spatial relationship with each of the plurality of the halftone graphical elements;
- e) generating a second proposed graphical input by placing the at least one graphical elements on the first proposed graphical input based on the respective assignment; and
- f) instructing the flexographic printing device to print the second proposed graphical input.

2. The method according to Embodiment 1, wherein analyzing the first proposed graphical input further comprises identifying the at least one highlight area indicated based on a lack of enabled pixels and a threshold level of pixel density.

3. The method according to at least one of the previous Embodiments further comprising, further comprising receiving the first proposed graphical input of the printing job from at least one of a scanner, desktop publishing software, illustrator software, and an external camera.

4. The method according to at least one of the previous Embodiments further comprising, further comprising receiving the first proposed graphical input of the printing job as a screened, rasterized file.

5. The method according to at least one of the previous Embodiments further comprising, wherein analyzing the first proposed graphical input further comprises identifying a location of each of the plurality of halftone graphical elements in the highlight areas.

6. The method according to at least one of the previous Embodiments further comprising, wherein assigning the at least one graphical element further comprises determining a size and a shape for each of the at least one graphical elements.

7. The method according to at least one of the previous Embodiments further comprising, further comprising determining the size and the shape of each of the at least one graphical elements based on at least one of the output resolution, the substrate used for the printing job, the press conditions, and the anilox roller line screen used.

8. The method according to at least one of the previous Embodiments further comprising, further comprising assigning varying levels of additional graphical elements that are increasingly larger based on pre-assigned minimum graphical element sizes.

9. The method according to at least one of the previous Embodiments further comprising, wherein analyzing the first proposed graphical input further comprises applying a first algorithm to determine the amount of white space.

10. A computer system for improving screening to increase stability in flexographic printing, the computer system in communication with a flexographic printing device, the computer system including a memory device and a processor, wherein the processor is configured to:
- a) receive a first proposed graphical input of a printing job;
- b) analyze the first proposed graphical input of the printing job to identify at least one highlight area containing a plurality of halftone graphical elements in the first proposed graphical input;
- c) determine an amount of white space between the plurality of the halftone graphical elements in the first proposed graphical input;
- d) assign at least one graphical element to be placed in a spatial relationship with each of the plurality of the halftone graphical elements;
- e) generate a second proposed graphical input by placing the at least one graphical elements on the first proposed graphical input based on the respective assignment; and
- f) instruct the flexographic printing device to print the second proposed graphical input.

11. The computer system of Embodiment 10, wherein the processor is configured to:
identify the at least one highlight area indicated based on a lack of enabled pixels and a threshold level of pixel density 12. The computer system of Embodiment 10, wherein the processor is configured to:
receive the first proposed graphical input of the printing job from at least one of a scanner, desktop publishing software, illustrator software, and an external camera.

13. The computer system of Embodiment 10, wherein the processor is configured to:
receive the first proposed graphical input of the printing job as a screened, rasterized file.

14. The computer system of Embodiment 10, wherein the processor is configured to:
identify a location of each of the plurality of halftone graphical elements in the highlight areas.

15. The computer system of Embodiment 10, wherein the processor is configured to:
determine a size and a shape for each of the at least one graphical elements.

16. A method of improved screening to reduce mottling in flexographic printing performed by a flexographic printing system, the flexographic printing system including a computer system and a flexographic printing device, the computer system including a memory device and a processor, the computer system in communication with the flexographic printing device, wherein the processor is configured to perform the method comprising:
receiving a first proposed graphical input of a printing job;
identifying at least one high density region in the first proposed graphical input;
identifying at least one candidate pixel within each of the at least one high density regions;
removing each of the at least one candidate pixels from the first proposed graphical input to create a second proposed graphical input; and
instructing the flexographic printing device to print the second proposed graphical input.

17. The method according to Embodiment 16, wherein identifying the at least one high density region further comprises identifying a region with a high density of activated pixels.

18. The method according to Embodiment 16, further comprising identifying the at least one high density region based upon a pre-defined range of acceptable activated pixel density values.

19. The method according to Embodiment 16, further comprising identifying the at least one high density region by:
identifying a normal activated pixel density within the first proposed graphical input; and
identifying at least one region exceeding the normal activated pixel density.

20. The method according to Embodiment 16, further comprising providing edge protection by:
identifying the edge of each of a plurality of graphical elements within the first proposed graphical input; and
identifying the at least one candidate pixels by excluding pixels that are within a pre-defined distance from the edge of the each of the plurality of graphical elements.

What is claimed is:

1. A method of improved screening of a continuous tone image to increase stability in flexographic printing performed by a flexographic printing system, the flexographic printing system including a computer system and a flexographic printing device, the method comprising:
using the computer system to (a) receive a plurality of settings for a screening process as input by an operator, wherein the settings include (i) a first changeover point to switch between application of an amplitude modulation screening technique and a frequency modulation screening technique within a highlight area of the continuous tone image and (ii) a second changeover point to switch between application of the amplitude modulation screening technique and the frequency modulation screening technique within a shadow area of the continuous tone image and (b) perform the screening process using the settings input by the operator, wherein the screening process comprises:
receiving the continuous tone image, wherein the continuous tone image includes one or more highlight areas and one or more shadow areas;
converting the continuous tone image into a plurality of halftone graphical elements to create a proposed graphical input, wherein the first changeover point is used to determine whether to use the amplitude modulation screening technique or the frequency modulation screening technique when creating the halftone graphical elements within each of the highlight areas, and wherein the second changeover point is used to determine whether to use the amplitude modulation screening technique or the frequency modulation screening technique when creating the halftone graphical elements within each of the shadow areas; and
instructing the flexographic printing device to expose the proposed graphical input onto a flexographic printing plate.

2. The method of claim 1, wherein the screening process further comprises:
determining an amount of white space between the halftone graphical elements in each of the highlight areas;
assigning at least one graphical element to be placed in a spatial relationship with each of the halftone graphical elements in each of the highlight areas; and
placing the at least one graphical element on the proposed graphical input based on the respective assignment.

3. The method of claim 2, wherein the screening process further comprises identifying each of the highlight areas in the proposed graphical input based on a lack of enabled pixels and a threshold level of pixel density.

4. The method of claim 2, wherein the proposed graphical input is received from at least one of a scanner, desktop publishing software, illustrator software, and an external camera.

5. The method of claim 2, wherein the proposed graphical input is received as a screened, rasterized file.

6. The method of claim 2, wherein the screening process further comprises identifying a location of each of the plurality of halftone graphical elements in each of the highlight areas.

7. The method of claim 2, wherein assigning the at least one graphical element further comprises determining a size and a shape for the at least one graphical element.

8. The method of claim 7, wherein determining the size and the shape of the at least one graphical element is based on at least one of the output resolution, the substrate used for the printing job, the press conditions, and the anilox roller line screen used.

9. The method of claim 7, wherein the screening process further comprises assigning varying levels of additional graphical elements that are increasingly larger based on pre-assigned minimum graphical element sizes.

10. The method of claim 2, wherein the screening process further comprises applying an algorithm to determine the amount of white space.

11. The method of claim 1, wherein the settings further include a size and a shape for the at least one graphical element.

12. A flexographic printing system for improving screening of a continuous tone image to increase stability in flexographic printing, comprising:
a computer system configured to (a) receive a plurality of settings for a screening process as input by an operator, wherein the settings include (i) a first changeover point to switch between application of an amplitude modulation screening technique and a frequency modulation screening technique within a highlight area of the continuous tone image and (ii) a second changeover point to switch between application of the amplitude modulation screening technique and the frequency modulation screening technique within a shadow area of the continuous tone image and (b) perform the screening process using the settings input by the operator, wherein the screening process comprises:
receiving the continuous tone image, wherein the continuous tone image includes one or more highlight areas and one or more shadow areas;
converting the continuous tone image into a plurality of halftone graphical elements to create a proposed graphical input, wherein the first changeover point is used to determine whether to use the amplitude modulation screening technique or the frequency modulation screening technique when creating the halftone graphical elements within each of the highlight areas, and wherein the second changeover point is used to determine whether to use the amplitude modulation screening technique or the frequency modulation screening technique when creating the halftone graphical elements within each of the shadow areas; and a flexographic printing device configured to expose the proposed graphical input onto a flexographic printing plate.

13. The flexographic printing system of claim 12, wherein the screening process further comprises:
determining an amount of white space between the halftone graphical elements in each of the highlight areas;
assigning at least one graphical element to be placed in a spatial relationship with each of the halftone graphical elements in each of the highlight areas; and
placing the at least one graphical element on the proposed graphical input based on the respective assignment.

14. The flexographic printing system of claim 13, wherein the computer system is configured to:
identify each of the highlight areas in the proposed graphical input based on a lack of enabled pixels and a threshold level of pixel density.

15. The flexographic printing system of claim 13, wherein the computer system is configured to:
receive the proposed graphical input from at least one of a scanner, desktop publishing software, illustrator software, and an external camera.

16. The flexographic printing system of claim 13, wherein the computer system is configured to:
receive the proposed graphical input as a screened, rasterized file.

17. The flexographic printing system of claim 13, wherein the computer system is further configured to:
identify a location of each of the plurality of halftone graphical elements in each of the highlight areas.

18. The flexographic printing system of claim 13, wherein the computer system is further configured to:
determine a size and a shape for the at least one graphical element.

19. The flexographic printing system of claim 12, wherein the settings further include a size and a shape for the at least one graphical element.

20. A method of improved screening to reduce mottling in flexographic printing performed by a flexographic printing system, the flexographic printing system including a computer system and a flexographic printing device, the method comprising:
using the computer system to perform a screening process comprising:
receiving a continuous tone image;
converting the continuous tone image into a plurality of halftone graphical elements to create a first proposed graphical input,
identifying at least one high density region in the first proposed graphical input;
identifying an edge of each of the graphical elements within the high density region;
identifying a plurality of candidate pixels within the high density region, wherein the candidate pixels exclude one or more pixels that are within a pre-defined distance from the edge of each of the of graphical elements within the high density region;
removing each of the candidate pixels from the first proposed graphical input to create a second proposed graphical input, wherein the one or more pixels that are within the pre-defined distance from the edge of each of the graphical elements within the high density region are not removed so as to provide edge protection during pixel removal; and
instructing the flexographic printing device to expose the second proposed graphical input onto a flexographic printing plate.

21. The method of claim 20, wherein identifying the at least one high density region further comprises identifying a region with a high density of activated pixels.

22. The method of claim 20, wherein identifying the at least one high density region is based upon a pre-defined range of acceptable activated pixel density values.

23. The method of claim 20, wherein identifying the at least one high density region comprises:
identifying a normal activated pixel density within the first proposed graphical input; and
identifying at least one region exceeding the normal activated pixel density.

* * * * *

UNITED STATES PATENT AND TRADEMARK OFFICE
CERTIFICATE OF CORRECTION

PATENT NO. : 11,446,923 B2
APPLICATION NO. : 16/795326
DATED : September 20, 2022
INVENTOR(S) : Bret Anthony Farrah It is certified that error appears in the above-identified patent and that said Letters Patent is hereby corrected as shown below:

In the Claims

Column 20, Line 17, delete "of each of the of" and insert -- of each of the -- therefore.

Signed and Sealed this
Eighth Day of November, 2022

Katherine Kelly Vidal
*Director of the United States Patent and Trademark Office*